UNITED STATES PATENT OFFICE.

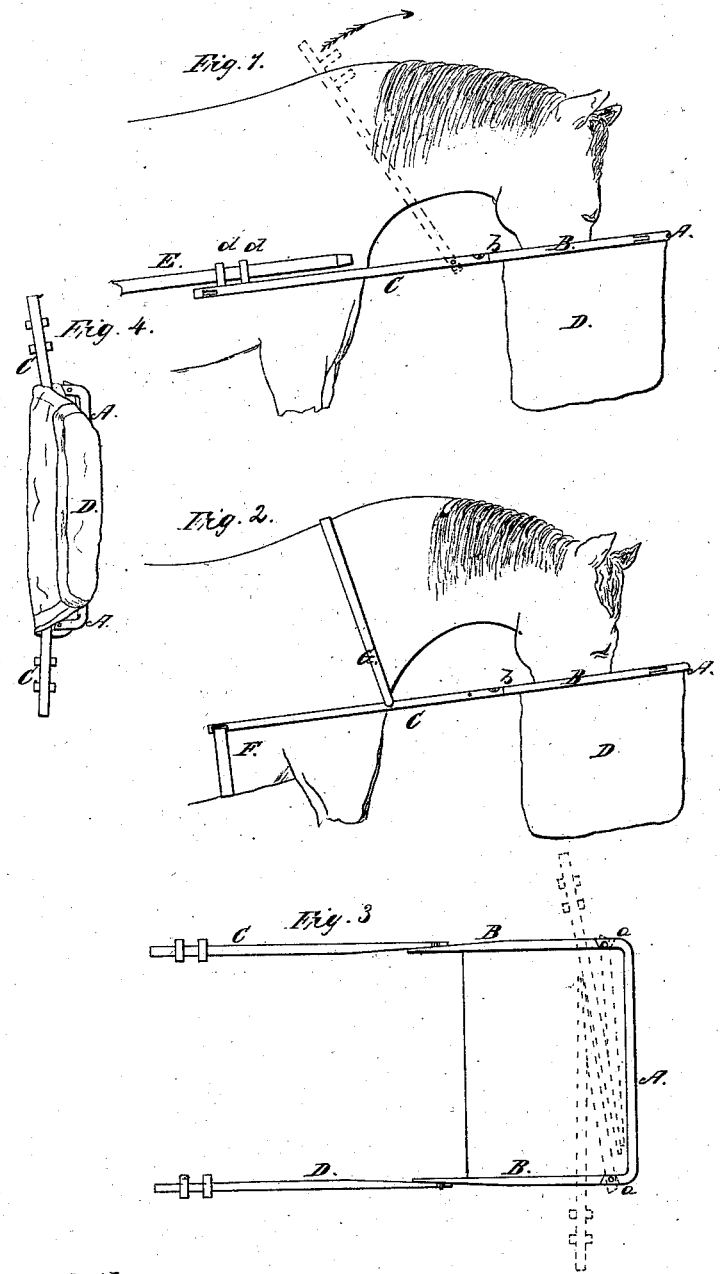

THOMAS FISLER, OF CAMDEN, NEW JERSEY.

PORTABLE MANGER.

Specification forming part of Letters Patent No. 33,242, dated September 10, 1861.

*To all whom it may concern:*

Be it known that I, THOMAS FISLER, of Camden, Camden county, New Jersey, have invented a Portable Manger; and I do hereby declare the following to be a full, clear, and exact description of the same, reference being had to the accompanying drawings, and to the letters of reference marked thereon.

My invention consists of certain rods hinged to each other and arranged substantially as described hereinafter, in combination with a bag and other appliances, the whole forming a portable manger readily attached to the body of a horse or to the shafts of a carriage.

The object of my invention is to afford for horses which have to be fed away from their stables a more convenient and accessible receptacle from which to abstract the food than ordinary nose-bags.

In order to enable others to make and use my invention, I will now proceed to describe the manner in which it is constructed and applied.

On reference to the accompanying drawings, which form a part of this specification, Figure 1 represents my improved portable manger applied to the shafts of a carriage; Fig. 2, the same applied to the body of a horse; Fig. 3, a plan view; Fig. 4, a view of the manger folded up.

Similar letters refer to similar parts throughout the several views.

The frame-work of the portable manger consists of a rod A, to each bent end of which is jointed a rod B and to each of the latter rods another rod C. Each rod B is so jointed to the rod A that the former can be moved inward toward the latter, the rods B B occupying the position shown by dotted lines, Fig. 4. The rods C C are so attached to the rods B B that the former can be moved in the direction shown by dotted lines and the arrow, Fig. 1, and made to take a position by the side of the rods B. The rods C, however, cannot be moved downward beyond the position shown in Figs. 1 and 2, as the end of each rod C bears against a pin *b*, projecting from the rod B. Three of the upper edges of a bag D, of canvas or other suitable material, are secured to the opposite rods B B and to the rod A, this bag forming the receptacle for the horse's food.

When the above-described frame with its bag has to be used as a portable manger for a horse attached to a carriage, I secure to the opposite rods C C and near the outer ends of the same two or more hoops *d d*, which are so adjusted to the shafts E of the carriage that the frame will be in a proper position for the horse to take its food from the bag.

If the apparatus has to be used for a saddle-horse or a horse taken from a carriage or other conveyance, I attach to the outer ends of the rods C C a strap F, which passes under and bears against the belly of the horse, another strap G being connected to the rods C and passing over the neck of the horse near the collar, as seen in Fig. 2.

In either case the device forms a convenient manger from which a horse can take its food with the same facility and comfort as from the ordinary permanent manger of a stable.

The advantages of the above-described portable manger over the well-known nose-bag in which the food, if the quantity is sufficient, is apt to interfere with the free breathing of the horse, or, if insufficient in quantity, is likely to be beyond reach of the horse's mouth, will be apparent without further description.

When the portable manger is not required for use, the opposite rods C C are detached from the shafts or the straps F G are unbuckled, as the case may be. After this each rod C is so moved as to take its place by the side of that rod B to which it is hinged. The folded rods are then moved as near as possible to the rod A, so as to occupy the position shown in dots, Fig. 3, after which the bag is wrapped round the whole of the rods, as seen in Fig. 4, where it may be bound with a strap or cord, so that the entire apparatus may be comprised in a small compass and be conveniently portable.

I claim as my invention and desire to secure by Letters Patent—

The rods A, B B, and C C, hinged to each other and arranged substantially as set forth, in combination with the hoops *d d* or the straps F and G, or other equivalent appliances, and the bag D, for the purpose specified.

In testimony whereof I have signed my name to this specification in the presence of two subscribing witnesses.

THOMAS FISLER.

Witnesses:
HENRY HOWSON,
JOHN WHITE.